United States Patent
Martin et al.

(10) Patent No.: US 9,026,287 B2
(45) Date of Patent: May 5, 2015

(54) METHOD AND SYSTEM FOR ENGINE CONTROL (71) Applicant: Ford Global Technologies, LLC, Dearborn, MI (US)

(72) Inventors: Douglas Raymond Martin, Canton, MI (US); Matthew D. Smith, Dearborn Heights, MI (US); Richard Paul Taylor, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 211 days.

(21) Appl. No.: 13/645,286

(22) Filed: Oct. 4, 2012

(65) Prior Publication Data

US 2014/0058596 A1 Feb. 27, 2014

Related U.S. Application Data (60) Provisional application No. 61/693,182, filed on Aug. 24, 2012.

(51) Int. Cl.
| | | |
|---|---|---|
| *B60L 9/00* | (2006.01) | |
| *B60L 11/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *B60W 20/00* | (2006.01) | |
| *F02D 28/00* | (2006.01) | |
| *F02D 41/22* | (2006.01) | |
| *B60W 50/02* | (2012.01) | |
| *F02D 41/08* | (2006.01) | |

(52) U.S. Cl.
CPC ............... *B60W 20/50* (2013.01); *F02D 28/00* (2013.01); *F02D 41/22* (2013.01); *B60W 50/0205* (2013.01); *F02D 41/08* (2013.01); *F02D 2200/602* (2013.01); *F02D 2250/18* (2013.01); *B60Y 2306/15* (2013.01); *B60Y 2300/474* (2013.01); *B60W 2510/0676* (2013.01); *B60W 2510/068* (2013.01); *B60W 2550/145* (2013.01)

(58) Field of Classification Search
CPC ......... F02D 41/22; F02D 28/00; F02D 41/08; F02D 2250/18; F02D 2200/602; B60Y 2306/15; B60Y 2300/474
USPC .......................................................... 701/22
See application file for complete search history.

(56) References Cited

U.S. PATENT DOCUMENTS

| | | | |
|---|---|---|---|
| 5,751,137 A | 5/1998 | Kiuchi et al. | |
| 6,446,614 B1 | 9/2002 | Matsuoka et al. | |
| 6,519,524 B2 | 2/2003 | Ito | |
| 6,575,146 B1 | 6/2003 | Kanai et al. | |
| 7,303,144 B2 * | 12/2007 | Alyanak | 239/88 |
| 7,448,459 B2 | 11/2008 | Kitajima et al. | |
| 7,562,559 B2 | 7/2009 | Chung et al. | |

(Continued)

*Primary Examiner* — Calvin Cheung
*Assistant Examiner* — Paula L Schneider
(74) *Attorney, Agent, or Firm* — David Kelley; Alleman Hall McCoy Russell & Tuttle LLP (57) ABSTRACT Methods are provided for holding an engine steady during a drive cycle to complete one or more diagnostic routines. The engine may be held steady while an operator torque demand varies if a sufficient number of diagnostic routines need to be completed and are enabled for completion. By holding the engine steady, an accuracy and completion of the diagnostic routines is improved.

20 Claims, 4 Drawing Sheets

(56) References Cited

U.S. PATENT DOCUMENTS

| | | | |
|---|---|---|---|
| 2007/0204816 A1* | 9/2007 | Russell et al. | 123/90.12 |
| 2012/0072060 A1* | 3/2012 | Zettel et al. | 701/22 |
| 2013/0274967 A1* | 10/2013 | Tan et al. | 701/22 |

* cited by examiner

METHOD AND SYSTEM FOR ENGINE CONTROL

CROSS-REFERENCE TO RELATED APPLICATIONS

This application claims priority to U.S. Patent Application No. 61/693,182 filed on Aug. 24, 2012, the entire contents of which are hereby incorporated herein by reference for all purposes.

FIELD

The present application relates to on-board diagnostic routines performed in vehicles, such as hybrid vehicles.

BACKGROUND AND SUMMARY

Reduced engine operation times in hybrid vehicles enable fuel economy and reduced fuel emissions benefits. However, the shorter engine operation times can lead to insufficient time for completion of various on-board diagnostic operations. These may include, for example, fuel system leak diagnostics, diagnostics for various engine sensors, etc.

One example approach to enable completion of on-board diagnostic routines involves maintaining or resuming engine operation for a duration to complete the routines. Another example approach is shown by Matsuoka et al. in U.S. Pat. No. 6,446,61 wherein an engine is held in a steady-state during engine operation so that a canister leak detection monitor can run.

However, the inventors herein have identified potential issues with such approaches. As an example, operating an engine to complete diagnostic routines may reduce fuel economy. As another example, holding an engine in a steady state to complete a leak detection may reduce a number of diagnostics that need to be completed, but not sufficiently. For example, even with the leak test completed during engine operation, the engine may need to be restarted at a later time to complete other diagnostics over a drive cycle. As such, these repeated intrusive engine operations may dissatisfy the vehicle operator. Specifically, a vehicle operator wanting to drive a hybrid vehicle in an electric mode may be dissatisfied with repeated engine operations that were not in response to an operator torque request.

In one example, some of the above issues may be addressed by a method for operating a hybrid vehicle comprising: performing a first set of diagnostic routines during steady engine conditions; performing a second different set of diagnostic routines during non-steady engine conditions; and during engine running following a first engine hot-start of a vehicle drive cycle, holding the engine steady in response to a total number of incomplete diagnostic routines in the first set. In this way, an accuracy and completion of on-board diagnostic routines is improved.

As an example, a control system of a hybrid vehicle may need to complete a variety of on-board diagnostic routines over a drive cycle for emissions compliance. The variety of on-board diagnostic routines may include a first set of routines that are (stringently) performed during steady engine operating conditions and a second set of routines that are performed during non-steady operating conditions. One or more of the diagnostic routines from either set may be opportunistically performed during a vehicle drive cycle as vehicle conditions shift from an electric mode of operation to an engine mode of operation and between engine steady and non-steady conditions. A controller may monitor a total number of diagnostic routines in each set that are completed as well as a number of those diagnostic routines that are enabled (that is, ready to be completed once the appropriate engine conditions are present).

During engine running following a first engine hot start of a vehicle drive cycle (that is, immediately following and contiguous with the engine running of the hot restart with no stops in between), in response to a ratio of the number of diagnostic routines of the first set that are incomplete and enabled relative to the total number of incomplete diagnostic routines of the first set being higher than a threshold, a controller may intrusively hold an engine steady for a duration. In particular, during a first engine start from rest where an engine temperature is above a threshold (that is, the engine has warmed up), an exhaust catalyst temperature is above a threshold (that is, an exhaust catalyst is sufficiently hot) and while the vehicle is travelling below a threshold altitude, the controller may hold an engine speed and load held within a threshold range, for a duration, irrespective of an operator torque demand over the duration. That is, the engine may be held steady with low variation in engine speed and load so that steady conditions are actively provided for completing the enabled and incomplete diagnostic routines of the first set. In the interim, an operator torque demand may be met by a system battery.

In this way, diagnostic routines requiring engine steady conditions can be completed during a drive cycle of a hybrid vehicle with reduced engine-on times. By holding the engine steady to complete the diagnostic routines only if a sufficient number of diagnostic routines are incomplete and enabled, repeated engine operation for completion of the routines is reduced. By completing the required set of diagnostic routines within a drive cycle, emissions compliance is improved. In addition, by holding the engine steady in a forced steady mode for diagnostic routines requiring stringent engine steady conditions, an accuracy and integrity of the results are improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
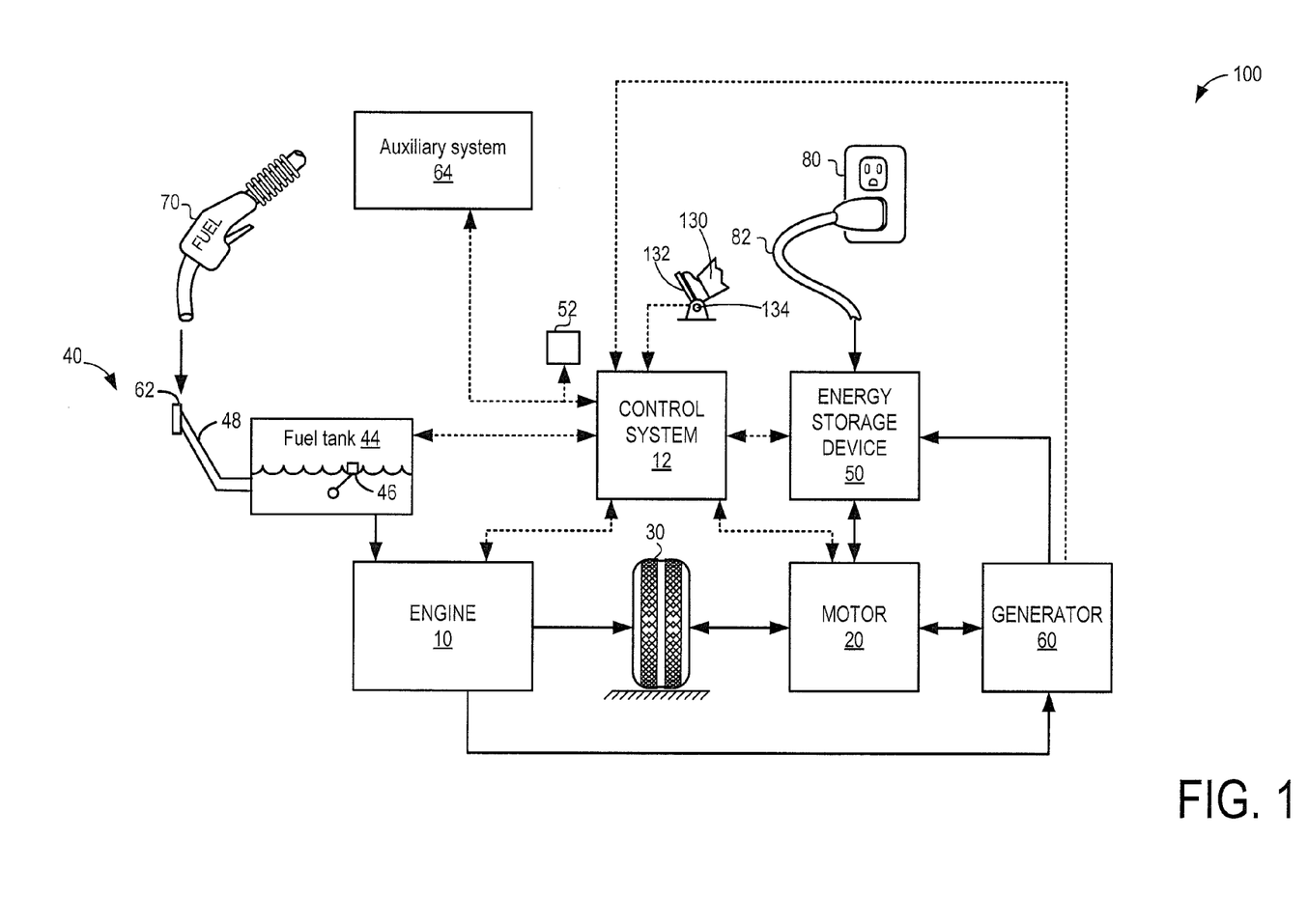
FIG. 1 illustrates an example vehicle system.
Figure 3:
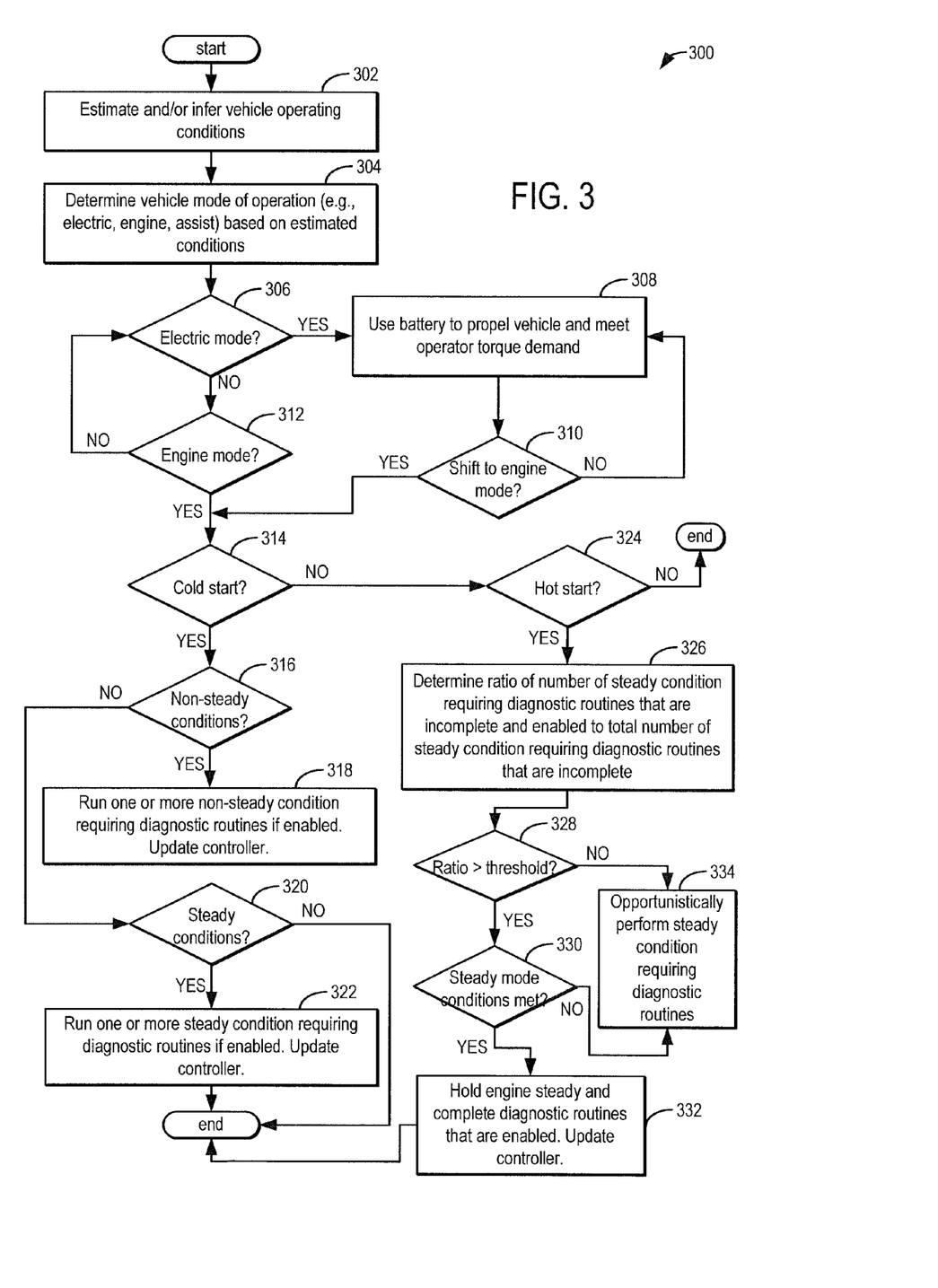
FIG. 3 illustrates a high level flow chart illustrating a routine for holding an engine steady to complete one or more diagnostic routines.
Figure 4:
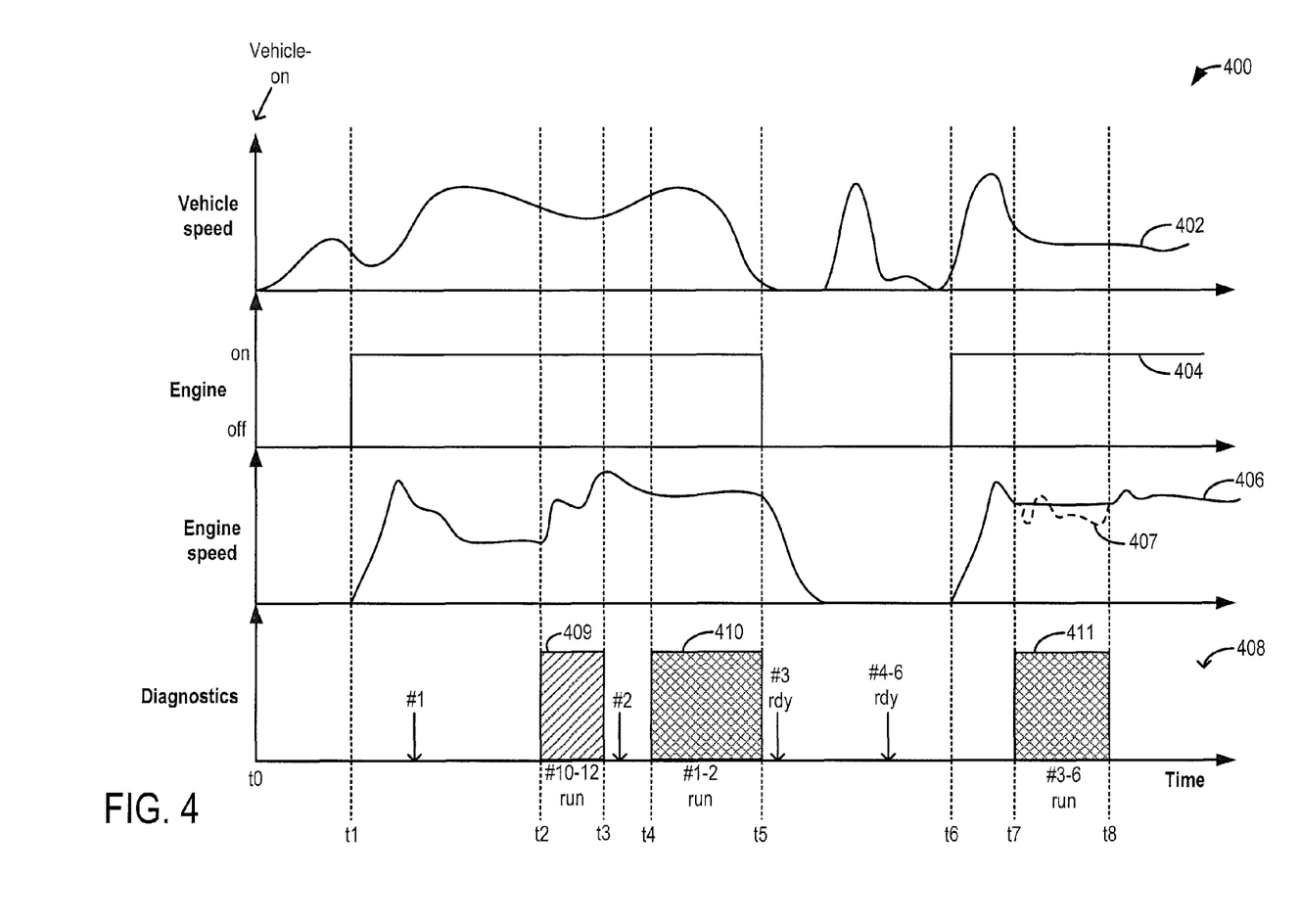
FIG. 4 illustrates example engine steady operations for completion of diagnostic routines.

The following description relates to systems and methods for operating a hybrid electric vehicle, such as the plug-in hybrid electric vehicle of FIG. 1. Based on a number of diagnostic routines that need to be completed during engine operation, in particular, during steady engine operation, an engine may be actively held in a steady mode for a duration to enable the routines to be completed. A controller may be configured to perform a routine during an engine hot start, such as shown in FIG. 3, to hold an engine in a steady mode for a duration so as to complete on-board diagnostic routines. The controller may decide to hold the engine in the steady mode based on a ratio of a number of diagnostic routines that are incomplete but enabled for completion (during steady engine conditions) relative to a total number of diagnostic routines that need to be completed (during the steady engine conditions). An example engine steady operation for completing diagnostics is shown at FIG. 4. In this way, on-board diagnostic routines can be completed during the limited engine operation time of a hybrid vehicle.

FIG. 1 illustrates an example vehicle propulsion system 100. Vehicle propulsion system 100 includes a fuel burning engine 10 and a motor 20. As a non-limiting example, engine 10 comprises an internal combustion engine and motor 20 comprises an electric motor. Motor 20 may be configured to utilize or consume a different energy source than engine 10. For example, engine 10 may consume a liquid fuel (e.g. gasoline) to produce an engine output while motor 20 may consume electrical energy to produce a motor output. As such, a vehicle with propulsion system 100 may be referred to as a hybrid electric vehicle (HEV). Specifically, propulsion system 100 is depicted herein as a plug-in hybrid electric vehicle (PHEV).

Vehicle propulsion system 100 may be operated in a variety of different modes depending on vehicle operating conditions. Some of these modes may enable engine 10 to be maintained in an off state (or deactivated state) where combustion of fuel at the engine is discontinued. For example, under select operating conditions, motor 20 may propel the vehicle via drive wheel 30 while engine 10 is deactivated.

During other operating conditions, engine 10 may be deactivated while motor 20 is operated to charge energy storage device 50 via regenerative braking. Therein, motor 20 may receive wheel torque from drive wheel 30 and convert the kinetic energy of the vehicle to electrical energy for storage at energy storage device 50. Thus, motor 20 can provide a generator function in some embodiments. However, in other embodiments, a dedicated energy conversion device, herein generator 60 may instead receive wheel torque from drive wheel 30 and convert the kinetic energy of the vehicle to electrical energy for storage at energy storage device 50.

During still other operating conditions, engine 10 may be operated by combusting fuel received from fuel system 40. For example, engine 10 may be operated to propel the vehicle via drive wheel 30 while motor 20 is deactivated. During other operating conditions, both engine 10 and motor 20 may each be operated to propel the vehicle via drive wheel 30. A configuration where both the engine and the motor may selectively propel the vehicle may be referred to as a parallel type vehicle propulsion system. Note that in some embodiments, motor 20 may propel the vehicle via a first set of drive wheels and engine 10 may propel the vehicle via a second set of drive wheels.

In other embodiments, vehicle propulsion system 100 may be configured as a series type vehicle propulsion system, whereby the engine does not directly propel the drive wheels. Rather, engine 10 may be operated to power motor 20, which may in turn propel the vehicle via drive wheel 30. For example, during select operating conditions, engine 10 may drive generator 60, which may in turn supply electrical energy to one or more of motor 20 or energy storage device 50. As another example, engine 10 may be operated to drive motor 20 which may in turn provide a generator function to convert the engine output to electrical energy, where the electrical energy may be stored at energy storage device 50 for later use by the motor. The vehicle propulsion system may be configured to transition between two or more of the operating modes described above depending on operating conditions.

Fuel system 40 may include one or more fuel storage tanks 44 for storing fuel on-board the vehicle and for providing fuel to engine 10. For example, fuel tank 44 may store one or more liquid fuels, including but not limited to: gasoline, diesel, and alcohol fuels. In some examples, the fuel may be stored on-board the vehicle as a blend of two or more different fuels. For example, fuel tank 44 may be configured to store a blend of gasoline and ethanol (e.g. E10, E85, etc.) or a blend of gasoline and methanol (e.g. M10, M85, etc.), whereby these fuels or fuel blends may be delivered to engine 10. Still other suitable fuels or fuel blends may be supplied to engine 10, where they may be combusted at the engine to produce an engine output. The engine output may be utilized to propel the vehicle and/or to recharge energy storage device 50 via motor 20 or generator 60.

Fuel tank 44 may include a fuel level sensor 46 for sending a signal regarding a fuel level in the tank to control system (or controller) 12. Fuel level sensor 46 may comprise a float connected to a variable resistor, as shown. Alternatively, other types of fuel level sensors may be used. The level of fuel stored at fuel tank 44 (e.g. as identified by the fuel level sensor) may be communicated to the vehicle operator, for example, via a fuel gauge or indication lamp indicated at 52. Fuel system 40 may periodically receive fuel from an external fuel source. For example, in response to a fuel level in the fuel tank falling below a threshold, a fuel tank refill request may be made and the vehicle operator may stop the vehicle for refilling. Fuel may be pumped into the fuel tank from fuel dispensing device 70 via a refueling line 48 that forms a passageway from a refueling door 62 located on an outer body of the vehicle.

As such, vehicle system may include various sensors and monitors that need periodic assessment. These may include, for example, a VCT monitor, an EGR monitor, an EGO sensor, a fuel monitor, an air-fuel ratio imbalance monitor, an FAOS sensor, as well as other routines such as leak detection routines. Periodic on-board diagnostic routines may be performed to confirm sensor/monitor functionality. In addition, to meet federal emissions requirements, on-board diagnostic (OBD) routines may need to be completed within a vehicle drive cycle. As such, some of the diagnostic routines may require steady engine operation for completion while others may require (or prefer) non-steady engine operation for completion. Still others may not need engine operation and may be performed during a drive cycle while a vehicle is in an electric mode. At least some of the diagnostic routines may be opportunistically completed as engine operation varies between steady and non-steady operation during a vehicle drive cycle. However, due to the limited engine running time in hybrid vehicles, a larger number of diagnostic routines may remain incomplete during regular engine operation. Intrusive (or obtrusive) engine operation, wherein an engine is started or engine operation is extended for the purpose of completing diagnostic routines are often dissatisfactory to the vehicle operator who is expecting to operate the hybrid vehicle in an electric mode. Thus, as elaborated herein at FIG. 3, at a first engine hot start during a vehicle drive cycle, an engine controller may hold an engine in a steady mode for a duration if a sufficient number of diagnostic routines are incomplete but enabled for completion (that is, ready to go). A controller may monitor an identity and number of diagnostics that need completion on a drive cycle, and are ready for completion. If a ratio of the number of diagnostics that are incomplete but ready to be completed relative to a total number that need to be completed is higher than a threshold, the controller may hold the engine steady and complete the tests. Else, if the number is lower than the threshold, the controller may continue to opportunistically complete the tests.

Control system 12 may communicate with one or more of engine 10, motor 20, fuel system 40, energy storage device 50, and generator 60. Specifically, control system 12 may receive feedback from one or more of engine 10, motor 20, fuel system 40, energy storage device 50, and generator 60 and send control signals to one or more of them in response. Control system 12 may also receive an indication of an operator requested output of the vehicle propulsion system from a vehicle operator 130. For example, control system 12 may receive feedback from pedal position sensor 134 which communicates with pedal 132. Pedal 132 may refer schematically to an accelerator pedal (as shown) or a brake pedal.

Energy storage device 50 may include one or more batteries and/or capacitors. Energy storage device 50 may be configured to store electrical energy that may be supplied to other electrical loads residing on-board the vehicle (other than the motor), including a cabin heating and air conditioning system (e.g., HVAC system), an engine starting system (e.g., starter motor), headlights, cabin audio and video systems, etc.

Energy storage device 50 may periodically receive electrical energy from an external power source 80 not residing in the vehicle. As a non-limiting example, vehicle propulsion system 100 may be configured as a plug-in hybrid electric vehicle (HEV), whereby electrical energy may be supplied to energy storage device 50 from power source 80 via an electrical energy transmission cable 82. During a recharging operation of energy storage device 50 from power source 80, electrical transmission cable 82 may electrically couple energy storage device 50 and power source 80. While the vehicle propulsion system is operated to propel the vehicle, electrical transmission cable 82 may be disconnected between power source 80 and energy storage device 50. Control system 12 may estimate and/or control the amount of electrical energy stored at the energy storage device, referred to herein as the state of charge (SOC).

In other embodiments, electrical transmission cable 82 may be omitted, where electrical energy may be received wirelessly at energy storage device 50 from power source 80. For example, energy storage device 50 may receive electrical energy from power source 80 via one or more of electromagnetic induction, radio waves, and electromagnetic resonance. As such, it should be appreciated that any suitable approach may be used for recharging energy storage device 50 from the external power source 80. In this way, motor 20 may propel the vehicle by utilizing an energy source other than the fuel utilized by engine 10.

Figure 2:
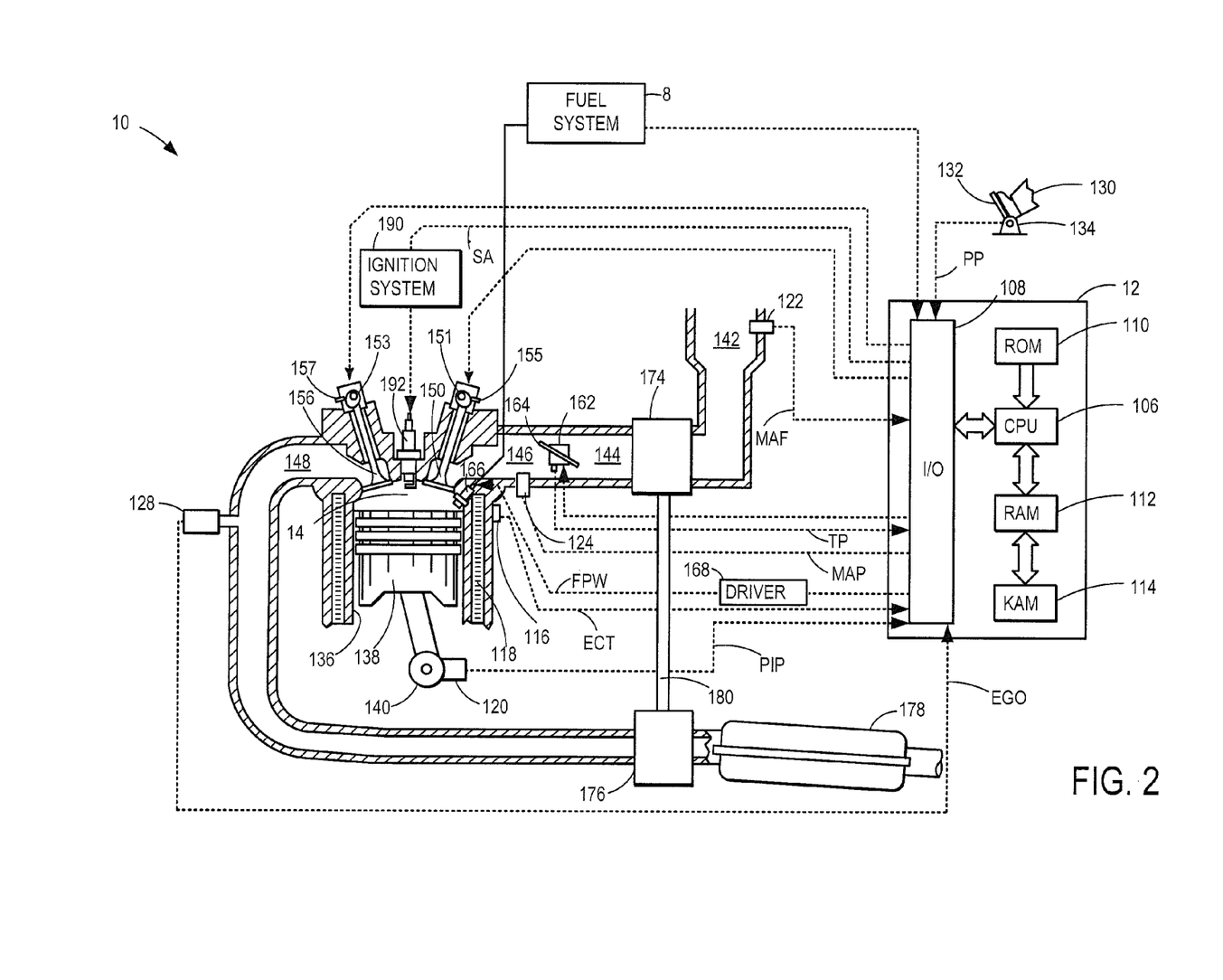
FIG. 2 illustrates an example internal combustion engine.

As elaborated in FIG. 2, controller 12 may receive input data from various sensors, process the input data, and trigger various actuators in response to the processed input data based on instruction or code programmed therein corresponding to one or more routines. An example control routine is described herein with regard to FIG. 3.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, different fuel volatilities, and/or combinations thereof etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Storage medium read-only memory 110 can be programmed with computer readable data representing instructions executable by processor 106 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 166, throttle 162, spark plug 192, intake/exhaust valves and cams, etc. The controller may receive input data from the various sensors, process the input data, and trigger the actuators in response to the processed input data based on instruction or code programmed therein corresponding to one or more routines. An example control routine is described herein with regard to FIG. 3.

Now turning to FIG. 3, an example method 300 is shown for completing various on-board diagnostic routines during an engine operation of a vehicle drive cycle. The method enables an engine to be held steady when a sufficient number of tests need to be completed.

At 302, vehicle operating conditions may be estimated and/or inferred. For example, the control system may receive sensor feedback from one or more sensors associated with the vehicle propulsion system components, as described above. Operating conditions estimated may include, for example, an indication of vehicle operator requested output or torque (e.g., based on a pedal position), a fuel level at the fuel tank, engine fuel usage rate, engine temperature, state of charge (SOC) of the on-board energy storage device, ambient conditions including humidity and temperature, engine coolant temperature, climate control request (e.g., air-conditioning or heating requests), etc.

At 304, based on the estimated vehicle operating conditions, a mode of vehicle operation may be selected. For example, it may be determined whether to operate the vehicle in an electric mode (with the vehicle being propelled using energy from an on-board system energy storage device, such as a battery), or an engine mode (with the vehicle being propelled using energy from the engine), or an assist mode (with the vehicle being propelled using at least some energy from the battery and at least some energy from the engine).

At 306, it may be determined if an electric mode of vehicle operation was selected. If yes, then at 308, the vehicle may be operated in the electric mode with the system battery being used to propel the vehicle and meet the operator torque demands. If an electric mode is not confirmed, at 312, it may be determined if an engine mode of vehicle operation was selected. If yes, then the vehicle may be operated in the engine mode with the engine being used to propel the vehicle and meet the operator torque demands. As such, even if an electric mode is selected at 308, the routine may continue monitoring the vehicle torque demand and other vehicle operating conditions to see if a sudden shift to engine mode (or engine assist mode) is required. Specifically, while in the electric mode, at 310 it may be determined if a shift to engine mode is requested.

If an engine mode if selected at 312, or if a shift from electric mode to engine mode occurs at 310, the routine proceeds to 314 to determine if an engine cold start is being performed. As such, an engine cold start may be confirmed in response to an engine start from rest when an exhaust light-off catalyst is below a threshold temperature (e.g., a light off temperature) or while an engine temperature (as inferred from an engine coolant temperature) is below a threshold temperature. In one example, a first engine start during a drive cycle may be a cold start. That is, when an engine is started to initiate vehicle operation in an engine mode, a first number of combustion events of the engine from rest to cranking may be at a lower temperature and may constitute a cold start. As another example, a vehicle may be started in an electric mode and then shifted to an engine mode. Herein, a first engine start during a transition from the electric mode to the engine mode, in a given vehicle drive cycle, may be a cold start.

If an engine cold start is confirmed, the routine may proceed to determine if engine non-steady conditions are present during engine running immediately following the cold start. These may include, for example, engine speed and load being outside of a steady threshold range, and/or a change or variation in engine speed and load being higher than a threshold amount. If non-steady conditions are confirmed, then at 318, the routine includes (opportunistically) performing one or more diagnostic routines requiring non-steady conditions during the engine running immediately following the cold start as a diagnostic routine becomes enabled. That is, if a monitor needs to be diagnosed during non-steady engine running conditions, and criteria for enabling the monitor to be diagnosed have been met, then as soon as engine non-steady conditions arise, the diagnostic routine for that monitor may be performed. A controller may be updated regarding the performing of the routine. For example, a flag for performing the routine can be disabled. Monitors that require non-steady engine conditions for diagnostics may include, for example, an exhaust catalyst monitor, fuel system leak detection monitor, CMS monitor, etc. For example, one or more of the monitors requiring non-steady conditions may be performed during a DFSO operation, or other non-steady engine conditions.

If non-steady conditions are not confirmed, the routine proceeds to 320 to determine if engine steady conditions are present during the engine running following the cold start. These may include, for example, engine speed and load being within a steady threshold range, and/or a change or variation in engine speed and load being lower than a threshold amount. If steady conditions are confirmed, then at 322, the routine includes (opportunistically) performing one or more diagnostic routines requiring steady conditions during the engine running immediately following the cold start as a diagnostic routine becomes enabled. That is, if a monitor needs to be diagnosed during steady engine running conditions following the cold start, and criteria for enabling the monitor to be diagnosed have been met, then as soon as engine steady conditions arise, the diagnostic routine for that monitor may be performed. A controller may be updated regarding the performing of the routine. For example, a flag for performing the routine can be disabled. Monitors that require steady engine conditions for diagnostics may include, for example, a VCT monitor, an EGR monitor, an EGO sensor, a fuel monitor, an air-fuel ratio imbalance monitor, an FAOS sensor, etc.

Returning to 314, if an engine cold start is not confirmed, the routine proceeds to 324 to determine if an engine hot start is present. As such, an engine hot start may be confirmed in response to an engine start from rest when an exhaust light-off catalyst is at or above a threshold temperature (e.g., a light off temperature) or while an engine temperature (as inferred from an engine coolant temperature) is at or above a threshold temperature. In one example, an engine may be started to initiate vehicle operation in an engine mode, and after a duration of vehicle operation, the engine may be temporarily stopped to perform an engine idle-stop or to continue vehicle operation in an electric mode. Then, after a duration of operation in the electric mode, or when restart from idle-stop conditions are met, the engine may be restarted (e.g., from rest) to reinitiate vehicle operation in the engine mode. During these conditions, a first number of combustion events of the engine from rest to cranking may be at a higher temperature (due to the prior engine operation) and may constitute a hot start.

If an engine hot start is confirmed, then at 326, the routine includes determining a number of steady condition requiring diagnostic routines that are incomplete (that is, need to go) as well as a number that are enabled (that is ready to go). Further, a ratio of the number of steady condition requiring diagnostic routines that are incomplete and enabled relative to a total number of steady condition requiring diagnostic routines that are incomplete may be determined.

At 328, it may be determined if the ratio is higher than a threshold. For example, it may be determined if the ratio is higher than 0.5 (that is, at least 50% of the routines that need to be completed are enabled). If the ratio is higher than the threshold, the controller may determine that there are a sufficient number of diagnostic routines that need to be completed and are ready to be completed if steady conditions are met. Thus, if steady engine conditions are actively provided, the routines can be completed in the drive cycle and emissions compliance can be achieved.

In response to the ratio being higher than the threshold, at 330, it may be determined if steady mode entry conditions have been met. In one example, steady mode entry conditions may be considered met if the engine is modestly warm (e.g., above a threshold, such as above 95° F.), the exhaust catalyst is warm (e.g., above a threshold, such as above 900° F.), and a vehicle altitude is below a threshold height (e.g., below 8000 ft). As such, diagnostic monitors may not run efficiently if an engine coolant temperature is cold, if an exhaust catalyst is cold, or at high altitudes where barometric pressure is high.

If steady mode entry conditions are met, then at 332, the routine includes during engine running following the hot start, holding the engine steady for a duration and completing the diagnostic routines that are incomplete and enabled. As used herein, during engine running following the hot start includes during engine running immediately following the hot start and contiguous with the engine running of the hot start (or hot restart) with no stops in between. In addition, the controller may be updated as the routines are completed. For example, a flag for performing the routine can be disabled. As used herein, holding the engine steady in the steady mode includes holding an engine speed and torque constant (or within a threshold) for the duration. In one example, the duration of operating in the steady mode is a fixed preset duration (e.g., 23 seconds). In another example, the duration of operating in the steady mode is adjusted based on the ratio estimated at 326, or the number of diagnostic routines that need to be completed and are enabled to do so. For example, as the number of enabled and incomplete diagnostic routines increases, the duration may be increased. Herein, by actively holding the engine steady for a duration when the engine is sufficiently hot, diagnostic routines that need to be completed during steady conditions can be completed in the given drive cycle. By holding the engine steady, in the steady mode, only if a sufficient number of diagnostic routines are incomplete and enabled, repeated intrusive engine operation for completion of diagnostics is reduced. In addition, the forced steady conditions during the steady mode may have lower variations in engine speed and load than unforced steady conditions during vehicle operation, improving the accuracy and integrity of diagnostic routines relying on steady conditions.

It will be appreciated that during the forced steady mode, an engine speed and load may be held steady even if an operator torque demand varies. That is, the engine speed and load may remain within a target or threshold range irrespective of the operator requested torque. In one example, while holding the engine steady, an operator requested torque may be provided from the system battery. If a sudden surge in torque demand occurs that cannot be met by the battery alone, the forced steady mode may be discontinued. That is, in response to the operator requested torque exceeding an amount that can be provided by the system battery, the controller may discontinue holding the engine steady so as to provide the operator requested torque from the engine. The controller may then update the total number of incomplete diagnostic routines. In addition, the controller may continue to opportunistically perform diagnostic routines when engine steady conditions are available. Alternatively, during a subsequent hot start of the vehicle drive cycle, the controller may reassess the ratio and, if steady mode entry conditions are met, reinitiate the steady mode to hold the engine steady and complete the remaining diagnostic routines.

In one example, a control system for a hybrid vehicle may perform a first set of diagnostic routines during steady engine conditions while performing a second different set of diagnostic routines during non-steady engine conditions. During engine running immediately following (and contiguous with the engine running of) a first engine hot-start (or hot restart) of a vehicle drive cycle, the controller may hold the engine steady in response to a total number of incomplete diagnostic routines in the first set. The holding may be further based on a number of incomplete diagnostic routines in the first set that are enabled at the first engine hot start. For example, the holding is based on a ratio of the number of incomplete diagnostic routines in the first set that are enabled at the first engine hot start relative to the total number of incomplete diagnostic routines in the first set, such as, in response to the ratio being higher than a threshold. Herein, holding the engine steady may include holding an engine speed and torque constant for a duration. The duration may be based on the number of incomplete diagnostic routines in the first set that are enabled at the first engine hot start. The first engine hot start may include an engine start from rest where an engine temperature is higher than a first threshold and an exhaust catalyst temperature is higher than a second, different threshold. The first engine hot start may further include an engine start from rest where an altitude of vehicle travel is lower than a threshold height. While holding the engine steady, an operator requested torque may be provided from a system battery. Further, in response to the operator requested torque exceeding an amount that can be provided by the system battery, the holding may be discontinued to provide the operator requested torque from the engine. Discontinuing the holding may include updating the total number of incomplete diagnostic routines in the first set.

As another example, during a first steady engine condition in a hybrid vehicle, one or more diagnostic routines may be performed irrespective of a total number of incomplete diagnostic routines. In comparison, during a second steady engine condition, one or more diagnostic routines may be performed based on a total number of incomplete diagnostic routines. Herein, the first steady condition may be an unforced or opportunistic steady condition while the second steady condition is a forced steady engine condition.

In one example, the first steady engine condition may include an engine speed and torque being within a threshold range and varying within the threshold range by more than a threshold amount, while the second steady engine condition includes the engine speed and torque being within the threshold range and varying within the threshold range by less than the threshold amount. In another example, the first engine steady condition may include one of an engine cold start, an engine hot start, and a period of steady engine operation over a vehicle drive cycle, while the second engine steady condition includes a first engine hot start over the vehicle drive cycle.

As yet another example, during a first engine hot-start of a vehicle drive cycle in a hybrid vehicle, in response to a number of enabled and incomplete diagnostic routines being higher than a threshold, an engine may be held steady to complete the incomplete diagnostic routines. Herein, the first engine hot-start of the vehicle drive cycle may include an engine start from rest where an engine temperature is higher than a first threshold and an exhaust catalyst temperature is higher than a second, different threshold. Holding the engine steady may include holding the engine within a threshold range of engine speed and load for a duration irrespective of an operator torque demand over the duration. Holding the engine steady may further include using a system battery to meet the operator torque demand over the duration. In response to an operator torque demand exceeding a threshold demand during the holding, a controller may discontinue holding the engine steady, update the number of incomplete diagnostic routines, and during a second, subsequent engine hot-start of the vehicle drive cycle, hold the engine steady to complete the updated number of incomplete diagnostic routines. As such, in response to the number of enabled and incomplete diagnostic routines being lower than the threshold, the controller may opportunistically complete one or more of the incomplete diagnostic routines during steady engine operation over the vehicle drive cycle.

Example engine steady conditions during which diagnostic routines may be completed are now shown with reference to FIG. 4. In particular, map 400 shows a change in vehicle speed at plot 402, an engine status (on or off) at plot 404, an engine speed at plot 406, and completion of diagnostic routines at plot 408 (including subplots 409-411). Map 400 is plotted over time along the x-axis.

At t0, a vehicle is turned on by a vehicle operator. Based on the vehicle operating conditions upon turning on the vehicle, such as a driver requested torque and vehicle speed (plot 402), a controller may determine to operate the vehicle in an electric mode with the engine turned off and with a system battery propelling the vehicle (plot 404). At t1, based on operating conditions, such as a demand for increased torque or due to a drop in battery state of charge, the vehicle may be shifted to an engine mode to propel the vehicle using torque from the engine. Accordingly, at t1, the engine may be turned on and an engine speed may start to increase (plot 406). As such, the engine start at t1 may constitute an engine cold start where the engine and an exhaust catalyst are not sufficiently warm (e.g., an engine coolant temperature and an exhaust catalyst temperature are below respective thresholds).

The engine may be run between t1 and t5 with engine speeds and loads varying based on operating conditions such as torque demand, vehicle speed, operator pedal position, ambient humidity, etc. During the engine running immediately following the cold start, between t1 and t5, there may be regions of steady engine operation (such as between t4 and t5) where an engine speed and load is within a threshold range and fluctuates less than a threshold amount, as well as regions of non-steady engine operation (such as between t2 and t3) where an engine speed and load is outside the threshold range and fluctuates more than the threshold amount.

Between t1 and t5, during the engine operation following the cold start, one or more diagnostic routines may be run opportunistically. The one or more diagnostic routines may include a first set of diagnostic routines that are run during steady engine conditions if the respective monitors are enabled as well as a second, different set of routines that are run during steady engine conditions if the respective monitors are enabled. In the depicted example, the first set of diagnostic routines may include monitors #1 through #6 while the second set of diagnostic routines may include monitors #10 through #12.

In the depicted example, shortly after t1, monitor #1 may become enabled (represented by the arrow annotated with #1). That is, monitor #1 may become ready to run and can be run thereafter if engine steady conditions are present. However, at that time, steady engine conditions may not be present for running the monitor. Therefore, the diagnostic routine for monitor #1 is not completed at that time and a controller is updated that one steady condition requiring monitor is enabled and needs to be run.

Between t2 and t3, monitors #10-12 may become enabled. That is, monitors #10-12 may become ready to run and can be run thereafter if engine non-steady conditions are present. In response to monitors #10-12 being enabled and non-steady engine conditions being met, between t2 and t3, monitor #10-12 are opportunistically run (as represented by shaded box 409). In addition, a controller is updated that all the non-steady condition requiring monitors have been run and no further non-steady condition requiring monitors need to be run.

Shortly after t3, monitor #2 may become enabled (represented by the arrow annotated with #2). That is, monitor #2 may become ready to run and can be run thereafter if engine steady conditions are present. However, at that time, steady engine conditions may not be present for running the monitor. Therefore, the diagnostic routine for monitor #2 is not completed at that time and a controller is updated that two steady condition requiring monitors are enabled and need to be run.

Between t4 and t5, engine steady conditions may be confirmed. In response to monitors #1-2 being already enabled and steady engine conditions being met, between t4 and t5, monitors #1-2 are run (as represented by shaded box 410). In addition, the controller is updated that two steady condition requiring monitors have been run, and that four steady condition requiring monitors (#3-6) are not yet enabled and need to be run on the current drive cycle.

At t5, due to a change in vehicle operating conditions, such as a change in vehicle speed and/or a battery state of charge being higher than a threshold (e.g., due to the battery being recharged during the engine running between t1 and t5), the vehicle may be shifted from the engine mode back to the electric mode. Accordingly, the engine may be shut down (with a corresponding drop in engine speed) and the vehicle may be propelled using the battery. The vehicle may continue to operate in the electric mode with the engine off between t5 and t6. In addition, between t5 and t6, monitors #3-6 may become enabled (represented by the arrows annotated with #3 and #4-6). However, due to the engine being off, the diagnostic routines for monitors #3-6 may not be completed.

At t6, based on a change in operating conditions, such as a demand for increased torque or due to a drop in battery state of charge, the vehicle may be transitioned back to the engine mode to propel the vehicle using torque from the engine. Accordingly, at t6, the engine may be restarted and an engine speed may start to increase (plot 406). As such, the engine start (or restart) at t6 may constitute an engine hot start where the engine and an exhaust catalyst are sufficiently warm (e.g., an engine coolant temperature and an exhaust catalyst temperature are at or above respective thresholds).

During the hot start, a controller may determine a ratio of diagnostic routines that are enabled relative to those that need to be completed. In the present example, the controller determines that two monitors (#1-2) have completed diagnostics, four monitors (#3-6) are enabled (or ready to run) and four (#3-6) need to be completed, giving a ratio of 4:4. In response to the ratio being higher than a threshold (e.g., higher than 0.5), a steady mode may be forced during the engine running following the engine hot start for a duration to allow the remaining diagnostic routines to be completed.

In particular, at t7, during the engine running immediately following the hot restart (that is, during the immediately contiguous engine running and with no stops in between), when the engine speed and load is within a target range or threshold range, the engine may be held in a steady condition for a duration. In the present example, the engine is held in the steady condition between t7 and t8. That is, the controller may hold an engine speed and load steady, and within the threshold range with substantially no fluctuations between t7 and t8. Between t7 and t8, torque demands requested by the vehicle operator may be met by the system battery.

In one example, the engine speed and load conditions during the forced engine steady operation at t7-t8 may be steadier than the engine speed and load conditions during the unforced steady operation at t4-t5. For example, during both steady operations, the engine speed and load may be within a target or threshold range, however, the engine speed and load may fluctuate more within the target range during the engine steady operation at t4-t5 while the engine speed and load may fluctuate less within the target range during the engine steady operation at t7-t8. In one embodiment, the vehicle controller may hold the engine speed and load fixed for the entire duration between t7 and t8 to enable diagnostic routines requiring steady conditions to be completed with higher reliability and integrity.

While the engine is held in the steady mode for the duration between t7 and t8, the enabled and incomplete diagnostic routines (for monitors #3-6) may be completed, as represented by shaded box 411. In one example, the duration (between t7 and t8) may be a preset duration (e.g., 19 seconds or 23 seconds). In another example, the duration may be based on the ratio. Alternatively, the duration may be based on the number of incomplete monitors that are enabled. For example, the duration may be increased as the number of incomplete and enabled monitors increases. At t8, following completion of the diagnostic routines, the forced engine steady operation may be discontinued. That is, the engine speed and load may not be held and the engine speed and load may be allowed to fluctuate, as needed, to meet the operator torque demand and other vehicle operating conditions.

It will be appreciated that while the system battery is used to meet operator torque demands between t7 and t8, there may be conditions when the operator torque demand is elevated and cannot be met by the battery alone. If an operator torque demand spikes while the engine is being held steady for completion of diagnostics, and if the battery cannot meet the spiked torque demand, then the controller may discontinue holding the engine running steady to allow the elevated torque demand to be met. The controller may then update the ratio based on a number of routines that were completed before the steady mode was discontinued. The controller may then reattempt operating in an engine steady mode during a subsequent engine hot start of the drive cycle.

As such, if the ratio estimated at t7 is not higher than the threshold, then engine operation may not be actively held steady during the engine running following the hot restart. For example, if only monitor #3 was enabled between t5 and t6 and monitors #4-6 were not enabled between t5 and t6 (and even up till t7), then the controller may determine that two monitors (#1-2) have completed diagnostics, one monitor (#3) is enabled (or ready to run) and four monitors (#3-6) need to be completed, giving a ratio of 1:4. In response to the ratio being lower than the threshold (e.g., lower than 0.5), a steady mode may not be forced during the engine running following the engine hot start for a duration to allow the remaining diagnostic routines to be completed. In particular, as shown by plot 407 (dashed lines), at t7, during the engine running immediately following the hot restart, the controller may not hold an engine speed and load steady, but may allow the engine speed and load to fluctuate, as needed, to meet operator torque demands and based on other vehicle operating conditions (e.g., vehicle speed). The controller may then continue to learn and update enablement of monitors. During a subsequent engine hot start (or hot restart) during the vehicle drive cycle, if the number of enabled and incomplete monitors is higher such that the ratio is higher than the threshold, then during engine running following that hot restart, the controller may hold the engine steady for a duration to allow diagnostic routines for the (remaining) incomplete and enabled monitors to be completed.

In this way, diagnostic routines requiring engine steady conditions can be completed during a drive cycle of a hybrid vehicle without requiring frequent engine restarts and without extending engine operation beyond an operator request. By holding an engine steady when it is sufficiently warm and while a sufficient number of incomplete diagnostic routines are enabled, on-board diagnostics can be completed within a vehicle drive cycle with reduced engine-on times. By reducing intrusion into an operator's desire for minimal engine run time in a hybrid vehicle, diagnostics can be completed without degrading the operator's perception of drivability. By completing the required set of diagnostic routines within a drive cycle, vehicle emissions compliance is improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle, comprising:
by a controller:
performing a first set of diagnostic routines during steady engine conditions;
performing a second different set of diagnostic routines during non-steady engine conditions; and
during engine running following a first engine hot-start of a vehicle drive cycle, in response to a total number of incomplete diagnostic routines in the first set, holding the engine steady for a duration until the incomplete diagnostic routines are completed.

2. The method of claim 1, wherein the holding is further based on a number of incomplete diagnostic routines in the first set that are enabled at the first engine hot start.

3. The method of claim 2, wherein the holding is further based on a ratio of the number of incomplete diagnostic routines in the first set that are enabled at the first engine hot start relative to the total number of incomplete diagnostic routines in the first set.

4. The method of claim 3, wherein the holding includes holding the engine steady in response to the ratio being higher than a threshold.

5. The method of claim 2, wherein holding the engine steady includes holding an engine speed and torque constant for a duration.

6. The method of claim 5, wherein the duration is based on the number of incomplete diagnostic routines in the first set that are enabled at the first engine hot-start.

7. The method of claim 1, wherein the first engine hot start includes an engine start from rest where an engine temperature is higher than a first threshold and an exhaust catalyst temperature is higher than a second, different threshold.

8. The method of claim 7, wherein the first engine hot-start further includes an engine start from rest where an altitude of vehicle travel is lower than a threshold height.

9. The method of claim 1, further comprising, while holding the engine steady, providing an operator requested torque from a system battery.

10. The method of claim 9, further comprising, in response to the operator requested torque exceeding an amount that can be provided by the system battery, discontinuing the holding to provide the operator requested torque from the engine.

11. The method of claim 10, wherein the discontinuing the holding includes updating the total number of incomplete diagnostic routines in the first set.

12. A method for a hybrid vehicle, comprising:
by a controller:
during a first steady engine condition, performing one or more diagnostic routines irrespective of a total number of incomplete diagnostic routines; and during a second steady engine condition, performing one or more diagnostic routines based on a total number of incomplete diagnostic routines.

13. The method of claim 12, wherein the first steady engine condition includes an engine speed and torque being within a threshold range and varying within the threshold range by more than a threshold amount, and wherein the second steady engine condition includes the engine speed and torque being within the threshold range and varying within the threshold range by less than the threshold amount.

14. The method of claim 12, wherein the first engine steady condition includes one of an engine cold start, an engine hot-start, and a period of steady engine operation over a vehicle drive cycle, and wherein the second engine steady condition includes a first engine hot-start over the vehicle drive cycle.

15. A method for a hybrid vehicle, comprising:
by a controller:
during a first engine hot-start of a vehicle drive cycle in response to a number of enabled and incomplete diagnostic routines being higher than a threshold, holding the engine steady to complete the incomplete diagnostic routines.

16. The method of claim 15, wherein the first engine hot-start of the vehicle drive cycle includes an engine start from rest where an engine temperature is higher than a first threshold and an exhaust catalyst temperature is higher than a second, different threshold.

17. The method of claim 16, wherein holding the engine steady includes holding the engine within a threshold range of engine speed and load for a duration irrespective of an operator torque demand over the duration.

18. The method of claim 17, wherein holding the engine steady further includes using a system battery to meet the operator torque demand over the duration.

19. The method of claim 18, further comprising, in response to an operator torque demand exceeding a threshold demand during the holding, discontinuing holding the engine steady, updating the number of incomplete diagnostic routines, and during a second, subsequent engine hot-start of the vehicle drive cycle, holding the engine steady to complete the updated number of incomplete diagnostic routines.

20. The method of claim 15, further comprising, in response to the number of enabled and incomplete diagnostic routines being lower than the threshold, opportunistically completing one or more of the incomplete diagnostic routines during steady engine operation over the vehicle drive cycle.

\* \* \* \* \*